A. J. FRICK.
METHOD OF AND MEANS FOR SEALING RECEPTACLES FOR FOOD PRODUCTS.
APPLICATION FILED JULY 21, 1916.

1,256,304. Patented Feb. 12, 1918.

INVENTOR.
Allen J. Frick.
BY Ralph N. Flint.
ATTORNEY.

UNITED STATES PATENT OFFICE.

ALLEN J. FRICK, OF FLEISCHMANNS, NEW YORK, ASSIGNOR OF ONE-FOURTH TO JOHN J. CAREY, OF ALBANY, NEW YORK.

METHOD OF AND MEANS FOR SEALING RECEPTACLES FOR FOOD PRODUCTS.

1,256,304.     Specification of Letters Patent.     Patented Feb. 12, 1918.

Application filed July 21, 1916. Serial No. 110,438.

*To all whom it may concern:*

Be it known that I, ALLEN J. FRICK, a citizen of the United States, and a resident of Fleischmanns, in the county of Delaware and State of New York, have invented certain new and useful Improvements in Methods of and Means for Sealing Receptacles for Food Products, of which the following is a specification.

My invention relates to the sealing of a receptacle containing a food product and in which the sealing is effected by the agency of a layer of wax poured while in a molten condition upon the surface of the contents of the receptacle, and particularly to the sealing of the contents of jelly glasses used in domestic preserving or canning operations by means of a layer of melted paraffin poured upon the surface of the contents of the glass or tumbler, although any suitable wax may be used. My invention is equally applicable for the purpose of sealing receptacles containing any kind of food products other than that above referred to, is applicable for the purpose of sealing a receptacle containing a substance not intended for food purposes, and in fact is applicable and capable of use in all cases in which access of air to the contents of a receptacle is to be prevented.

In the old method or scheme of sealing receptacles containing a food or other product by pouring melted wax upon the surface of the contents of the receptacle, the joint secured between the periphery of the layer of wax which results as the molten wax cools and the inner surface of the wall of the receptacle with which the periphery of the layer of wax contacts, was imperfect owing to the difficulty of securing a satisfactory and permanent union between the inner surface of the receptacle and the wax; and, as a further and more serious objection incident to this method of sealing, the joint between the periphery of the wax and the wall of the receptacle offered little or no resistance to forces tending to move the periphery of the layer of wax along the surface of the receptacle with which it was intended to be in permanent engagement, with the result that the layer of wax was liable to become displaced in handling the containers after the sealing had been accomplished, this destroying the joint between the periphery of the wax and the wall of the receptacle and producing a leak which would permit access of air with a consequent spoiling of the contents of the receptacle.

My invention contemplates and the object thereof is to provide an interlocking connection or joint between the periphery of the layer of wax resting upon the surface of the contents of a receptacle and the wall of said receptacle, the purpose of which interlocking joint or connection is to prevent shifting or displacement of the layer of wax should the containers be tipped into an inclined position, or perhaps placed on their sides or even turned bottotm upward, in handling the goods; incidently, such interlocking joint or connection, apart from and in addition to preventing displacement of the layer of wax, provides a more extensive connection or joint, that is, a joint of greater area, between the periphery of the layer of wax and the inner wall of the receptacle, and results in a joint less likely to leak or permit access of air to the contents of the receptacle than the joint secured in the old method above outlined in which the interlocking connection wherein my invention consists is not present.

With the above and other objects in view, my invention consists in the improved method of and means for sealing a receptacle for food or other products hereinafter described, explained, and claimed, and illustrated in and by means of the drawing accompanying and forming a part of this specification, and in such variations and modifications thereof as will be obvious to those skilled in the art to which my invention relates.

In the drawing accompanying and forming a part of this application:

Figure 1:
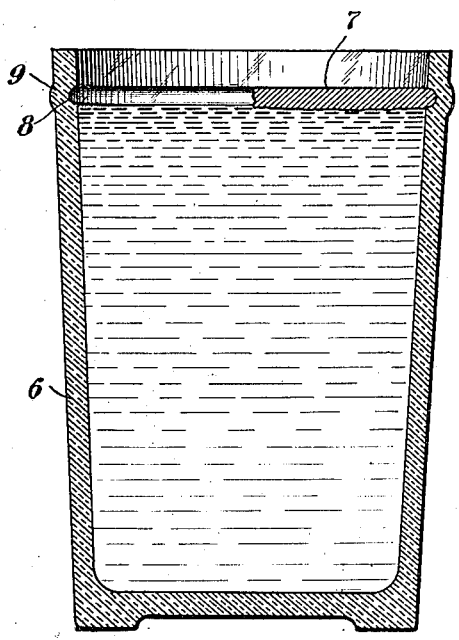
Figure 1 is a view illustrating in section a container for food or other products, and in which the sealing of the contents of the container is accomplished in accordance with my invention.
Figure 5:
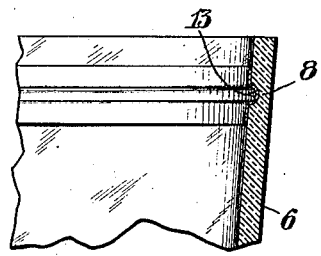
Fig. 5 is a view illustrating an auxiliary feature of my invention whereby a better bond is secured between the periphery of the wax layer and the wall of the receptacle.

Referring to the drawing, the reference numeral 6 designates a receptacle such, for example, as an ordinary jelly glass or tumbler of the kind used in domestic canning and preserving operations, although the particular form or character of the receptacle is immaterial; and 7 designates a layer of wax resting directly upon the contents of the receptacle 6, as shown, and the periphery of which layer forms an interlocking joint or connection with, or is interlocked with the wall of the receptacle; the receptacle and the layer of wax together constituting a container in which access of air to the contents thereof is prevented as will be understood. When said layer of wax is in place and has become cool, it being understood from the introductory matter hereinbefore appearing that the wax is poured upon the surface of the contents of the receptacle while in molten condition, the periphery thereof will be securely and permanently interlocked with the wall of the receptacle and the layer as a whole will be held in place and against displacement, because of such interlocking joint or connection.
The interlocking joint or connection between the periphery of the layer of wax and the wall of the receptacle may be provided for and secured in various ways, all within the purport and scope of my invention.
Thus in Fig. 1 a single circumferentially extending groove 8 approximately semi-circular in cross section is formed in the inner surface of the wall of the receptacle adjacent the upper end thereof, and into which groove the melted wax runs as it is poured upon the surface of the contents of the receptacle, the receptacle having been first filled up to about the level of the groove by the food or other product to be preserved, as will be understood. This groove 8 may be associated with an external ridge 9 to thereby preserve a substantially uniform thickness of material of the wall of the receptacle as in Fig. 1, or it may be formed in an unthickened wall as shown in Figs. 2 and 5.

Figure 2:
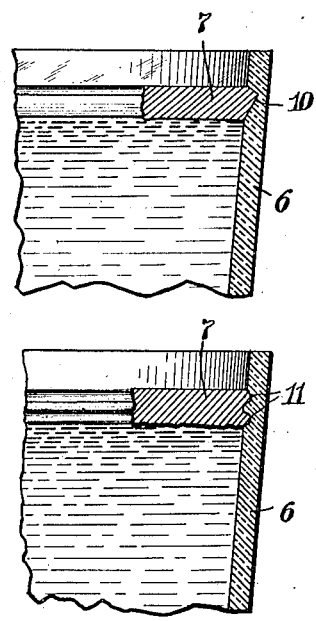
Fig. 2 is a fragmentary sectional view illustrating a modification of one of the features of my invention.
Figure 3:
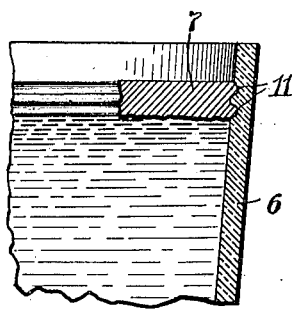
Figs. 3 and 4 are similar views illustrating other modifications.

In the form of my invention illustrated in Fig. 2, the groove 10 is angular in cross section, while in the form shown in Fig. 3 a plurality of comparatively small grooves or depressions 11, extending parallel with one another and circumferentially of the receptacle, are provided, with which grooves the periphery of the layer of wax contacts and provides an interlocking joint in substantially the same way as in the case of a single groove.

In Figs. 1, 2, 3, and 5 the groove or grooves or equivalent depressions into which the molten wax runs extend beyond or out from the inner surface of the wall of the receptacle and into the wall, so that the container may be conveniently opened by forcing a knife blade through the layer of wax at the place where it joins the wall, and moving it along the receptacle with its cutting edge in contact with the inner wall of the receptacle, thus cutting the portion of the wax layer within the inner boundary of the wall of the receptacle free and leaving a narrow annular portion of the periphery of the layer within the groove or grooves.

Figure 4:
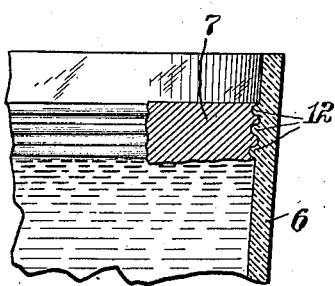

The interlocking joint between the periphery of the wax layer and the wall of the receptacle may, however, be provided for as shown in Fig. 4, in which form of my invention a plurality of circumferentially extending ridges 12 or equivalent projections, are located upon and project from the inner surface of the wall of the receptacle, with which ridges or projections the molten wax contacts as it is poured upon the contents of the receptacle to thereby provide an interlocking joint or connection between the periphery of the layer of wax and the wall of the receptacle and thereby prevent accidental displacement of the layer.

In practising my invention the receptacle is filled with the food or other products to be preserved up to about the level of the lower end or under side of the groove or other feature or device with which periphery of the wax layer engages to form an interlocking joint, as aforesaid, and the molten wax is poured onto and when cool rests directly and throughout its entire area upon the surface of the food or other product contained in the receptacle, so that no space or pocket containing air can occur between the layer of wax and the contents of the container; and the interlocking joint, in addition to its function of preventing displacement of the layer of wax, serves to more effectively prevent access of air to the contents of the container, because of the fact that the area of contact between the wax and the wall of the receptacle is more extensive than would be the case if the features whereby interlocking is secured, were not present.

It follows from the fact that in practising my invention the receptacle is filled to about the level of the groove or grooves that in some cases and when dealing with some kinds of products the groove might be wetted in filling the receptacle, either by accidental splashing or by capillary action or creeping of the material to be preserved along the inner surface of the receptacle and into the groove, which wetting might act to prevent a satisfactory bond between the wax and the surface of the groove; and, in order to prevent such wetting and to secure a better bond between the periphery of the layer of wax and the surface of the groove, I may coat the groove and the adjacent surface of the wall with a thin coating of wax such, for example, as paraffin, as shown at 13, Fig. 5, which wax will prevent the wetting of the groove. This thin wax coating will be softened by the molten wax subsequently poured upon the contents of the receptacle, and a better bond and a joint through or along which air is less likely to leak will thereby be secured between the layer 7 and the wall of the receptacle than would be the case if the coating 13 were not used. However, in many canning and preserving operations the objectionable feature above referred to is not met with and the groove would not be wetted, and even if wetted the joint would be sufficiently tight for all practical purposes; so that I wish it clearly understood that my invention, broadly considered does not necessarily include the coating in question, the coating being in the nature of an auxiliary feature of value in the special cases referred to and under the particular circumstances hereinbefore pointed out.

Having thus described and explained my invention I claim and desire to secure by Letters Patent—

1. A container for food products comprising a receptacle having a circumferentially extending groove formed in its inner surface and located adjacent its upper end; together with closing and sealing means for said receptacle comprising a layer of wax resting upon the contents of the receptacle and the periphery of which layer extends into said groove.

2. A container for food products comprising a receptacle; a layer of wax resting upon the contents of the receptacle and forming the sole closing means therefor; and means located adjacent the upper end of said receptacle and engaged by the periphery of said layer for preventing displacement thereof.

3. A container for food products comprising a receptacle having a circumferentially extending groove formed in its inner surface and located adjacent its upper end; a coating of wax within said groove; and a layer of wax resting upon the contents of the receptacle and the periphery of which extends into said groove.

4. In combination, a receptacle adapted to contain a food product; a layer of wax adapted to rest upon the contents of the receptacle and to form a closure therefor; and means whereby the periphery of said layer is interlocked with the wall of said receptacle to thereby prevent displacement of said layer.

5. In combination, a receptacle adapted to contain a food product; a layer of wax adapted to rest upon the contents of and to form closing means for said receptacle, and the periphery of which layer extends beyond the inner surface of said receptacle; and means engaging the periphery of said layer for preventing displacement thereof.

6. The method of sealing a receptacle containing a food product which consists in pouring melted wax upon the surface of the contents of said receptacle, and in providing an interlocking joint between the periphery of the layer of wax thus formed and the wall of said receptacle to thereby prevent displacement of said layer.

7. A container for food products comprising a receptacle; a layer of wax resting upon the contents of the receptacle and which layer forms closing means for and extends to the inner surface of said receptacle; and means in engagement with the periphery of said layer for preventing movement of said periphery relative to the inner surface of said receptacle.

8. A container for food products comprising a receptacle; a layer of wax resting upon the contents of the receptacle and which layer extends to the inner surface of and forms a closure for said receptacle; and interlocking means whereby the periphery of said layer is prevented from movement relative to the inner surface of said receptacle.

In testimony whereof I have signed my name to this specification this 12th day of July, 1916.

ALLEN J FRICK.